United States Patent [19]

Coles

[11] Patent Number: 4,821,619

[45] Date of Patent: Apr. 18, 1989

[54] KEY SIGNATURE ACTUATOR FOR A MUSICAL KEYBOARD

[76] Inventor: Donald K. Coles, 2505 Capitol Ave., Fort Wayne, Ind. 46806

[21] Appl. No.: 166,464

[22] Filed: Mar. 10, 1988

Related U.S. Application Data

[63] Continuation-in-part of Ser. No. 921,407, Oct. 22, 1986, Pat. No. 4,750,399, which is a continuation-in-part of Ser. No. 736,701, May 22, 1985, Pat. No. 4,640,173.

[51] Int. Cl.[4] ........................ G09B 15/02; G10B 3/20; G10G 1/04

[52] U.S. Cl. ........................................ 84/448; 84/453; 84/482

[58] Field of Search .................... 84/1.01, 423 R, 433, 84/442, 445, 448, 451, 453, 477 R, 478–482

[56] References Cited

U.S. PATENT DOCUMENTS 765,937 7/1904 Reese .................................. 84/480

3,949,638 4/1976 Coles .................................. 84/1.01

*Primary Examiner*—Stanley J. Witkowski

[57] ABSTRACT

A key signature actuator for a musical keyboard eases playing from music written with difficult key signatures by automatically actuating the sharps or flats in the key signatures. The keyboard has five back digitals per octave span, like the traditional keyboard, except that the back digitals are de-emphasized as landmarks by making them light gray, and musical notes are associated with movable landmarks, rather than with fixed digitals. When in written music a key signature is indicated, the landmarks are electronically shifted so that the key note of that key signature is played by a tonic digital (a fixed front digital to the immediate left of a group of two back digitals). At the same time the tonic digital is made to sound the key tone corresponding to that key signature by adjusting the overall pitch of the musical output by means of a uniform pitch changer. The number of electrically changeable landmark elements is minimized and binary coding is used to simplify the electrical connections. Apparatus for moving the landmarks mechanically is also disclosed.

6 Claims, 10 Drawing Sheets

FIG. 1
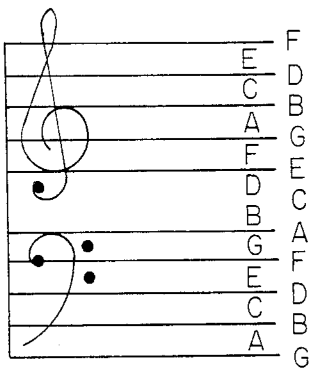
FIG. 2
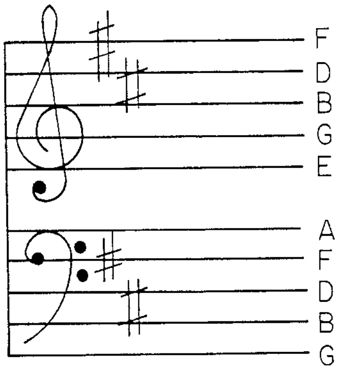
FIG. 3
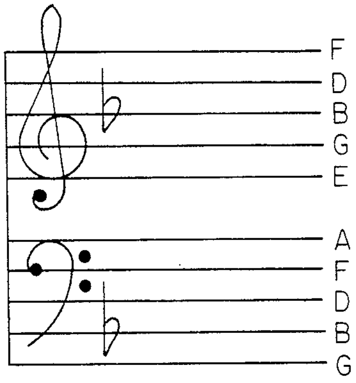
FIG. 4
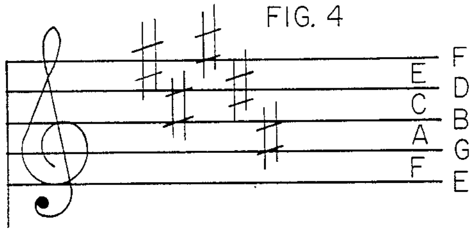
FIG. 5
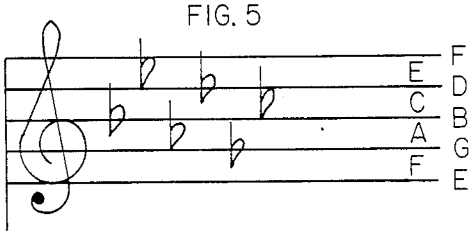
| MUSICAL NOTE | KEY SIGNATURES OF SHARPS C,0# | G,1# | D,2# | A,3# | E,4# | B,5# | F#,6# | C#,7# |
|---|---|---|---|---|---|---|---|---|
| F | F♭ | F# | F# | F# | F# | F# | F# | F# |
| C | C♭ | C♭ | C# | C# | C# | C# | C# | C# |
| G | G♭ | G♭ | G♭ | G# | G# | G# | G# | G# |
| D | D♭ | D♭ | D♭ | D♭ | D# | D# | D# | D# |
| A | A♭ | A♭ | A♭ | A♭ | A♭ | A# | A# | A# |
| E | E♭ | E♭ | E♭ | E♭ | E♭ | E♭ | E# | E# |
| B | B♭ | B♭ | B♭ | B♭ | B♭ | B♭ | B♭ | B# |
| | 7♭,C♭ | 6♭,G♭ | 5♭,D♭ | 4♭,A♭ | 3♭,E♭ | 2♭,B♭ | 1♭,F♭ | 0♭,C |
| | KEY SIGNATURES OF FLATS | | | | | | | |
FIG. 6
FIG. 7
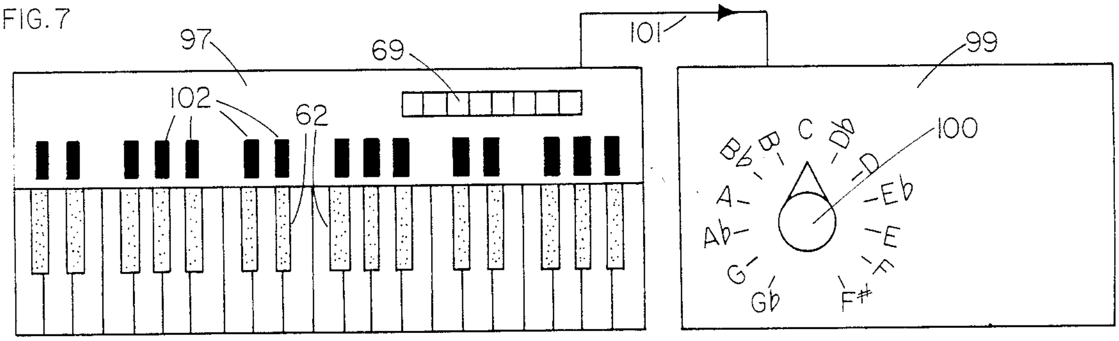

FIG. 8
| SCALE DEGREES | |
|---|---|
| I | TONIC |
| II | SUPERTONIC |
| III | MEDIANT |
| IV | SUBDOMINANT |
| V | DOMINANT |
| VI | SUPERDOMINANT |
| VII | SUBTONIC |
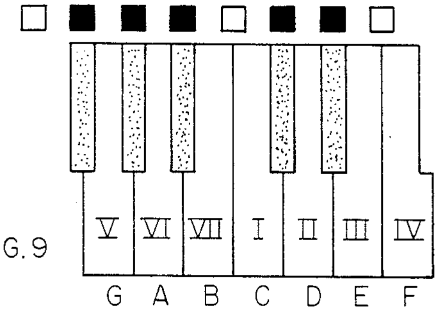
FIG. 9
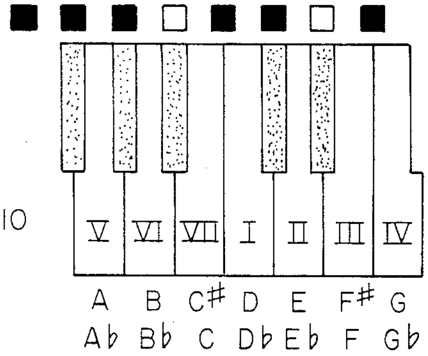
FIG. 10
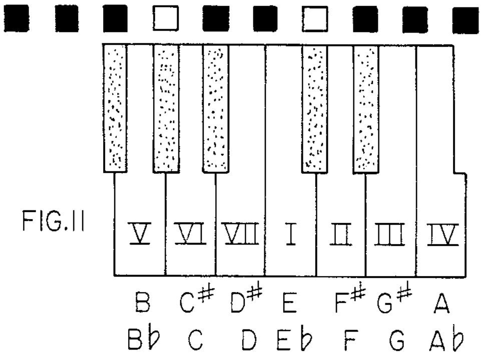
FIG. 11
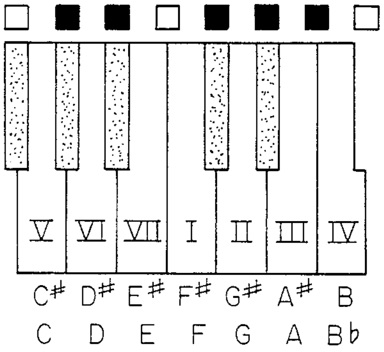
FIG. 12
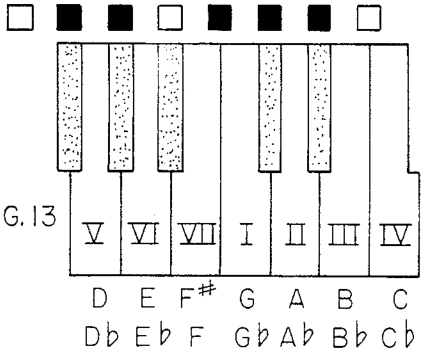
FIG. 13
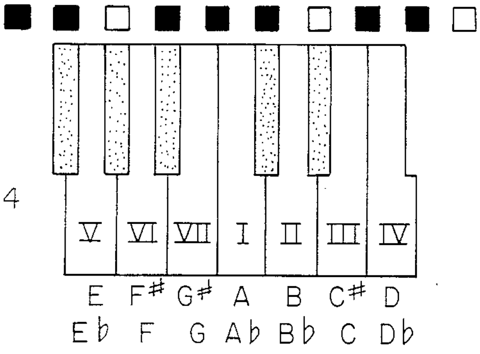
FIG. 14
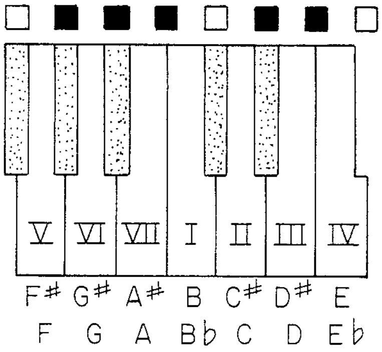
FIG. 15

FIG. 16
| KEY SIGNATURE CHANGES | KEY-NOTE | MOVE LEFT (d) M | INCREASE PITCH (ST) N=2M-1, 2M |
|---|---|---|---|
| 5♭,2# | D♭,D | 1 | 1,2 |
| 3♭,4# | E♭,E | 2 | 3,4 |
| 1♭,6# | F,F# | 3 | 5,6 |
FIG. 17
| KEY SIGNATURE CHANGES | KEY-NOTE | MOVE RIGHT (d) M | DECREASE PITCH (ST) N=2M, 2M-1 |
|---|---|---|---|
| 2♭,5# | B♭,B | 1 | 2,1 |
| 4♭,3# | A♭,A | 2 | 4,3 |
| 6♭,1# | G♭,G | 3 | 6,5 |
FIG. 18
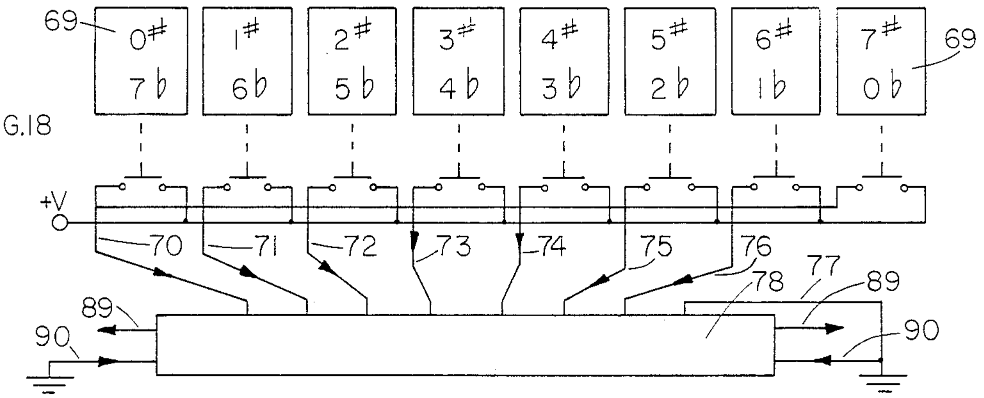
FIG. 19
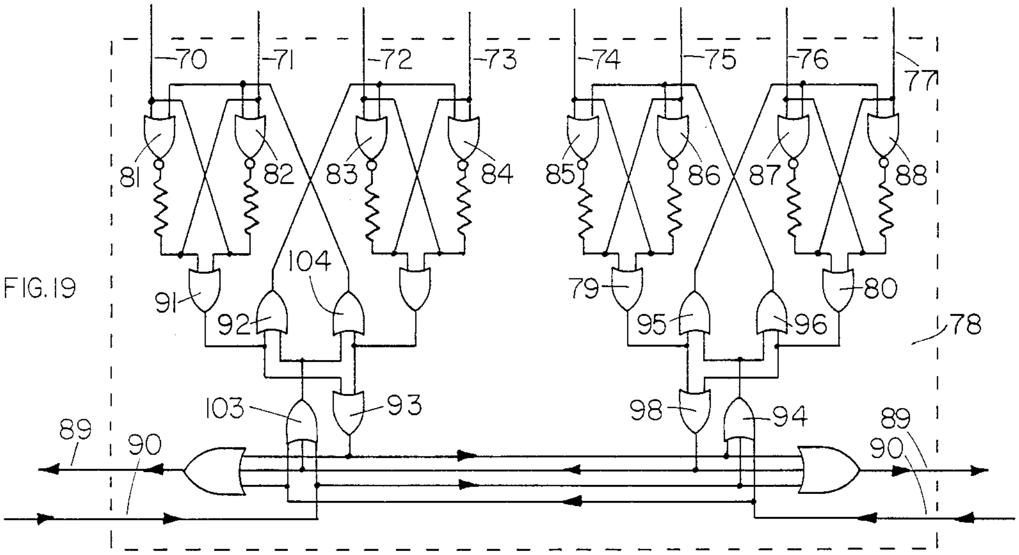

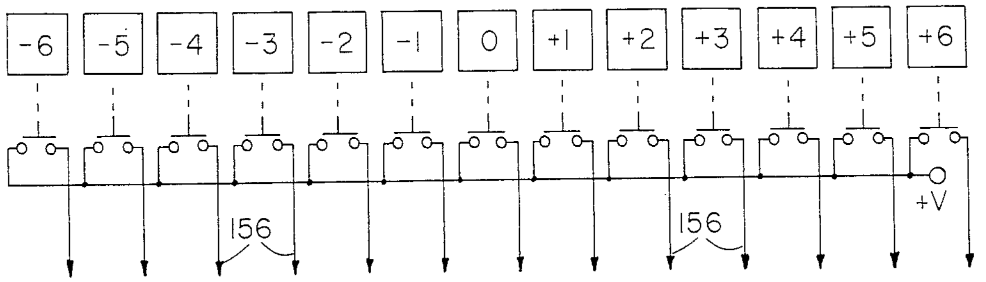
FIG. 38
FIG. 39
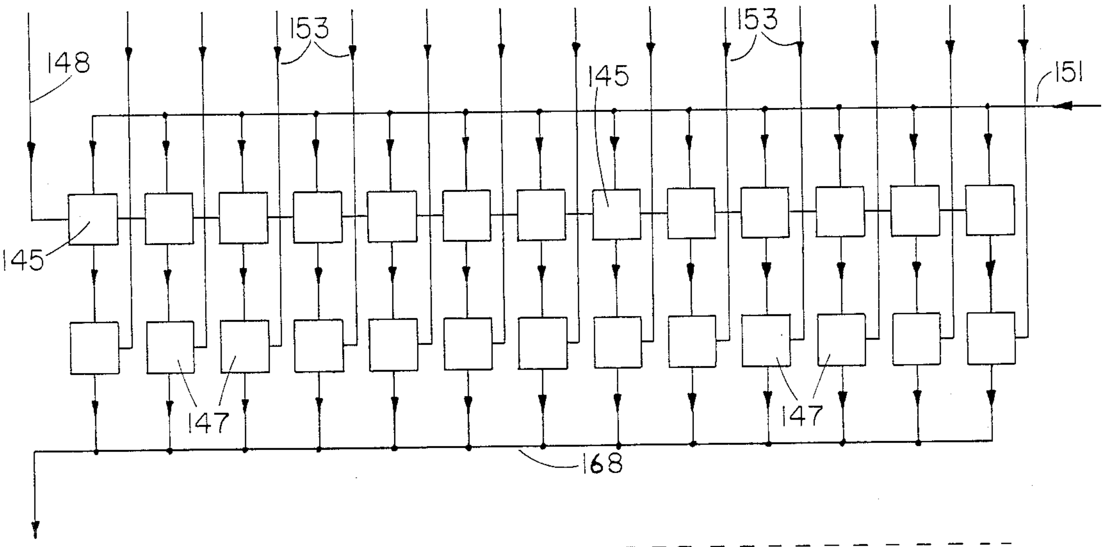
FIG. 40
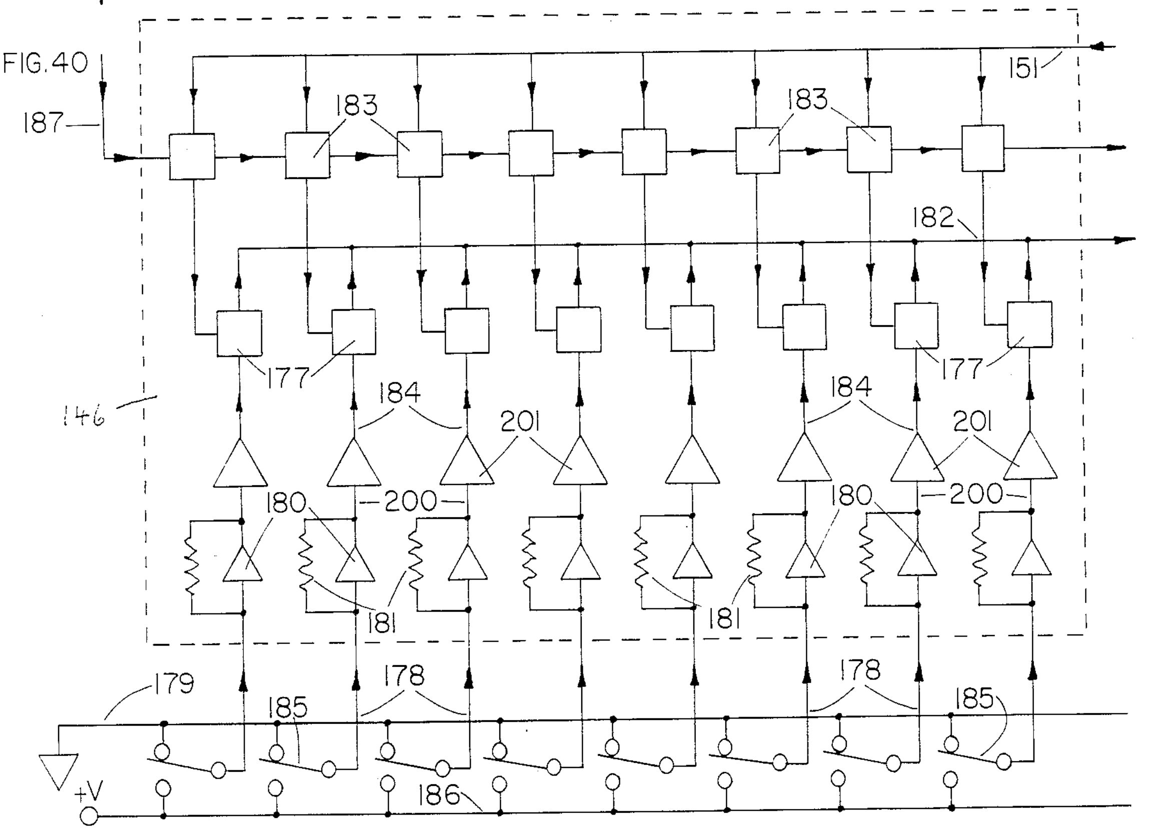

KEY SIGNATURE ACTUATOR FOR A MUSICAL KEYBOARD

CROSS REFERENCE TO RELATED APPLICATIONS

This application is a continuation-in-part of patent application Ser. No. 921,407 filed 10/22/86, U.S. Pat. No. 4,750,399 which is a continuation-in-part of patent application Ser. No. 736,701, filed 5/22/85, now U.S. Pat. No. 4,640,173.

BACKGROUND OF THE INVENTION

1. Field of the Invention

A key signature actuator for a musical keyboard eases playing from music written with difficult key signatures by automatically actuating the sharps or flats in the key signatures.

2. Description of the Prior Art

The musical keyboard is structured so as to facilitate performance of music in the major diatonic key of C. As early as the fifteenth century, keyboard musical instruments have had a row of front digitals to play the diatonic scale and a row of back digitals to play other tones of the chromatic scale. The major mode of the diatonic scale is started with the C tone, played on a C front digital. The succeeding D, E, F, G, A, B tones are played on the succeeding front digitals.

The traditional way of writing music, used as early as the eleventh century, is to position symbols on a staff consisting of horizontal lines. The seven tones of the diatonic scale are now represented by notes on five-line staffs. Interspersed tones of the chromatic scale are referred to the notes of the basic diatonic scale by means of sharp or flat symbols which serve as corrections up or down from notes of the basic diatonic scale. Thus, a chromatic tone intermediate to the C and D tones is represented by C# or Db.

For a tonal musical composition to be written without the use of sharp or flat symbols, it must be written in the key of C. Such a restriction would severely limit the choice of a modern composer, for he probably wants to base his composition on a tonic above or below the C tone. This would be no problem for singers or for musical instruments having uniform pitch changers; but many musical instruments do not have such pitch changers. So composers and their publishers resort to a rather unsatisfactory method for specifying the absolute pitch of their diatonic scale—they start the major mode of their diatonic scale on some other note than C. This method requires that one or more of the seven diatonic notes be corrected by means of a sharp or flat symbol. The composer finds it convenient to specify these note corrections by means of a key signature that is placed at the front of each line of written music. Key signatures greatly reduce the effort needed to write modern music and to understand the written music.

In the case of a keyboard player, these key signature corrections are played on the back digitals. This detracts from the former virtue of the traditional keyboard of providing wide front digitals for the most commonly used tones, which are those of the diatonic scale. And having learned to play a musical composition written in one key, a keyboard musician finds that playing the composition written in a different key requires different fingering. Furthermore, the ordinary keyboard player has difficulty remembering and playing all the shapes or flats called for in the fourteen possible key signatures of written music.

To alleviate these difficulties, a keyboard instrument can be provided with a device to automatically actuate the tone corrections specified in the key signature. Such a device, which I call a key signature actuator, was disclosed in Martin Philipps in 1886 (U.S. Pat. Nos. 354,733, 466,907 and 519,071. If, for example, the device was set for a key signature with one sharp, then the F front digital would play not the F tone but the F# tone instead, as called out in the key signature. This century-old key signature actuator has not been widely used because of its mechanical complexity and expense. Indeed key signature actuators appear to be unavailable commercially.

Uniform pitch changers, which are widely available commercially, are generally used to change the pitch of the keyboard output away from the intended pitch of written music, perhaps to accommodate a particular singer or group of singers. However, for two seldom-used key signatures calling for seven sharps and seven flats (keys of C-sharp and C-flat) the musical composition can be played in the key of C and a uniform pitch changer can be used to change the pitch of the keyboard output to the intended pitch of the written music. The simple device does not work for the other twelve key signatures of written music, however, because in order to play a diatonic scale on the front digitals it would be necessary to associate a sequence of seven notes in the written music with a changed sequence of seven digitals of the keyboard.

It would of course be possible to rewrite all music in the key of C for the benefit of keyboard players possessing uniform pitch changers, but such rewritten music would not be satisfactory for playing on other instruments or on other keyboards not having uniform pitch changers. Thus rewriting the music in an easier key is not an entirely satisfactory solution to the problem of difficult key signatures.

Electrical versions of a key signature actuator are described in my U.S. Pat. Nos. 3,986,422, 4,640,173 and 4,048,893. In the last of these inventions the keyboard fingering of accidentals is quite different for different key signatures. The other two patents disclose key signature actuators that do not have this disadvantage, but they require two extra back digitals per octave span. All of these key signature actuators operate by altering the interdigital musical intervals of the tones played by a first set of front digitals.

Traditionally, the front digitals are identified by their position with respect to the groups of two or three back digitals, which serve as landmarks. Beginning keyboard students are taught to memorizs the letter labels for the lines and spaces of two musical staffs, to recognize the letter label for each note of written music, and to find its corresponding front digital on the keyboard using the grouping of the back digitals as landmarks. My copending patent application Ser. No. 921,407, U.S. Pat. No. 4,750,399 discloses a key signature actuator for the traditional keyboard which operates by associating notes of the written music with a set of movable keyboard landmarks, rather than with particular keyboard digitals. In operation of this key signature actuator, a uniform pitch changer is adjusted so that a "C" digital of the keyboard will sound the tonic of the written music, and at the same time the keyboard landmarks are bodily shifted along the keyboard, so that the key note of the written music will be played on that digital. This has the effect of automatically actuating the sharps and flats in the key signature of the written music.

In that disclosure one set of movable keyboard landmarks, which simulates the back digitals, uses seven separate electronic control modules for each octave span of the keyboard. Another set of keyboard landmarks, which simulates the musical staff lines, uses a separate electronic control module for each two front digitals of the keyboard. In manufacture of this device a large part of the cost is due to these many separate electronic control modules, since each of the control modules requires seven signal input leads and a majority of them have ten power output leads to separate landmark elements.

A key signature actuator greatly reduces the mechanical difficulty of playing from music written in other keys than C, because the most frequently used tones are again played on the wide front digitals of the keyboard. The mental difficulty of reading from written music is also reduced, so that the player can afford more attention to expressive aspects of the music.

SUMMARY OF THE INVENTION

A key signature actuator for a musical keyboard eases playing from music written with difficult key signatures by automatically actuating the sharps or flats in the key signatures. The keyboard has five back digitals per octave span, like the traditional keyboard, except that the back digitals are de-emphasized as landmarks by making them light gray, and musical notes are associated with movable landmarks, rather than with fixed digitals. When in written music a key signature is indicated, the landmarks are shifted so that the key note of that key signature is played by a tonic digital (a fixed front digital to the immediate left of a group of two back digitals). At the same time the tonic digital is made to sound the key tone corresponding to that key signature by adjusting the overall pitch of the musical output by means of a uniform pitch changer. Thus all diatonic tones in the indicated key will be automatically sounded by the front digitals of the keyboard.

In the preferred embodiment an array of landmark elements (seven per octave span) at the back of the keyboard simulates the traditional groupings of two and three back digitals. Each landmark element is electrically changeable so that it can appear either light or dark. In a second embodiment the electrically changeable landmark elements are positioned of the front digitals, to represent the musical staffs of the written music. The pattern of light and dark landmark elements is bodily movable to seven discrete positions along the keyboard. The selection of a key signature is made by means of an electrical switch, the electrical signal from the switch being converted into binary code and transmitted to electronic control modules distributed along the keyboard, which control the individual landmark elements. An automated uniform pitch changer is provided to automatically adjust the overall pitch of the musical output to that intended in the written music. The transposer then provides an independent uniform pitch changer for departing from the intended pitch of the written music in order to accommodate a particular singer or group of singers. In a third embodiment a sequence of electrically changeable letter labels for the tones of the diatonic scale is shown on a narrow display strip in front of the keyboard, this sequence of letters being moved bodily along with the landmark pattern on the front digitals. In one embodiment a strip carrying landmarks in front of the keyboard is moved by rack and pinion gear to seven discrete positions along the keyboard.

BRIEF DESCRIPTION OF THE DRAWINGS

FIGS. 1–5 show musical staffs and representative key signatures.

FIG. 6 is a table of diatonic key signatures.

FIG. 7 shows a musical keyboard and a sound generating module.

FIG. 8 is a table of degrees of the diatonic scale.

FIGS. 9–15 show movable keyboard landmark patterns in seven different positions.

FIGS. 16, 17 are tables of uniform pitch changes that are coordinated with the different positions of the movable landmark patterns.

FIG. 18 shows a pushbutton array for selecting a key signature.

FIG. 19 shows an electronic interlock module for the pushbutton array.

FIG. 38 shows an array of pushbuttons for the manually controlled uniform pitch changer of the second embodiment.

FIG. 39 shows a delay line as used in the second embodiment.

FIG. 40 shows keyboard digital switches and a multiplexer module for the second embodiment.

DESCRIPTION OF THE PREFERRED EMBODIMENT

Figure 20:
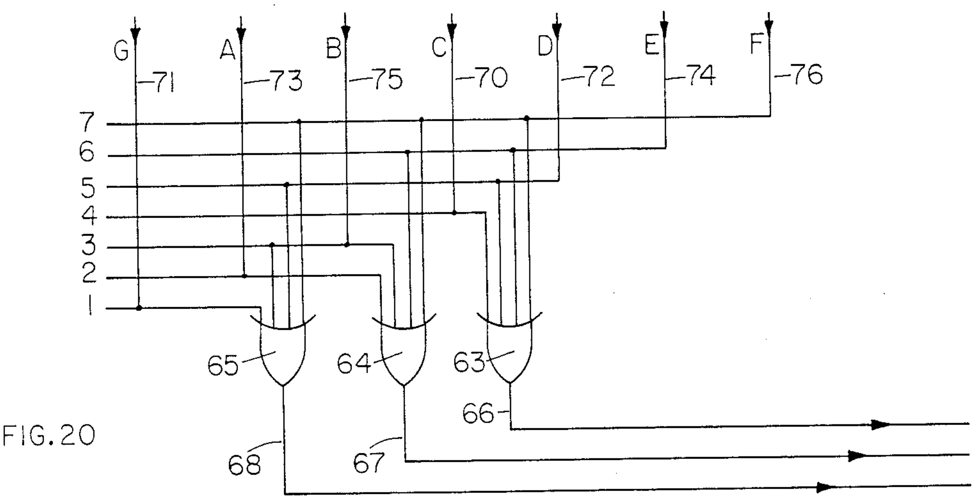
FIG. 20 shows a transmitter for landmark pattern position signals.

The tones of the major diatonic scale, usually labelled C-D-E-F-G-A-B, have intertone music intervals of 2-2-1-2-2-2-1 semitones. Traditional music notation, which is based on this scale, is shown in FIGS. 1 to 5. Referring to these figures, lines of the treble staff are labeled E, G, B, D, F; spaces of this staff are labeled F, A, C, E. The musical staffs shown in FIG. 1 are used to play music in the key of C. Music to be played in one of the other fourteen keys uses a key signature as shown in FIGS. 2–6.

FIG. 2 shows a key signature indicating that the notes F# and C# are to be substituted where the F and C notes are indicated in the body of the score. This substitution allows the diatonic scale to start on the D noted instead of the C note. The note substitutions for all fourteen traditional key signatures are listed in FIG. 6.

Referring to FIG. 6, the top line shows the key notes and the number of sharps in the seven key signatures of sharps. The bottom line shows the key notes and the number of flats in the seven key signatures of flats. The first column identifies the seven notes of the diatonic scale. The body of the table shows their note substitutions specified by each of the key signatures.

The traditional musical keyboard is structured so that its front digitals play the major diatonic scale in the key of C, and the back digitals correspond to the 2's in the sequence 2-2-1-2-2-2-1 of semitone intervals in the diatonic scale following the key note C. For purposes of discussion a tonic digital is defined here as a front digital immediately preceding a group of two back digitals. Then one can make a more general statement—the traditional keyboard is structured so that its front digitals play the major diatonic scale starting with its key note on a tonic digital. My invention provides assistance to the musician in positioning other key notes than C on a tonic digital.

Keyboard musicians with any degree of training are accustomed to locating the different musical notes on the keyboard by using the irregular grouping of the back digitals as landmarks. I therefore use a movable landmark pattern that simulates the irregular spacing of the back digitals, and associate musical notes with particular places in the movable landmark pattern, rather than with fixed digitals. Part of the landmark display is shown in FIG. 7. Referring to FIG. 7, the keyboard has the traditional configuration with seven front digitals and five back digitals 62 per octave span. The movable landmark pattern uses seven electrically changeable landmark elements 102 per octave span, of which five at a time are dark.

Dark landmarks 102 can be moved along the keyboard by means of pushbutton array 69 into seven discrete positions—one for each note of the diatonic scale. Consecutive positions are spaced from each other by a distance "d" which is one seventh of an octave span. The different positions are specified by their distance from a fixed reference point on the keyboard. For definiteness of description the reference point is here chosen to be the center one of the seven landmark positions, which is the position shown in FIG. 7. Inspection of FIG. 7 shows that the landmark elements are approximately aligned with the back digitals 62, so that this "standard" position is suitable for playing in the key of C. In all of their positions the seven landmark elements per octave span are precisely aligned with the cracks between the front digitals at the front of the keyboard, though the back digitals themselves are usually moved slightly from these positions to make more room for the player's fingers. The back digitals are de-emphasized as landmarks by making them a light gray. Musical notes in written music are to be associated with the changeable landmarks 102 rather than with particular digitals.

Signals regarding closures of the keyboard digital switches are transmitted on lead 101 to a commercial sound module 99 containing a uniform pitch changer 100. This is set at standard pitch when playing in the key of C. When playing from music written with a difficult key signature, the uniform pitch changer is set so that the tonic corresponding to the difficult key signature is played by a tonic digital. (A front digital to the immediate left of a group of two back digitals.) At the same time the movable landmarks are moved bodily along the keyboard to a position where the key note of the written music will be played by the tonic digital. The succeeding degrees of the diatonic scale will be played by the succeeding front digitals of the keyboard.

The landmarks in their seven discrete positions are shown in FIGS. 9 to 15. Referring to FIG. 9, the dark landmarks are aligned approximately with the back digitals for playing music written in the key of C. The seven front digitals are identified by Roman numerals I to VII, which are commonly used to identify the seven degrees of the diatonic scale. The tonic digital is identified by means of the Roman numeral "I". Names commonly used for all seven scale degrees are listed in FIG. 8. When playing in the key of C the uniform pitch chamber in the sound module is set to its standard position, as shown in FIG. 7.

In FIG. 10 the same twelve digitals are shown, but the landmark pattern has been moved bodily to the left by the width of one front digital, for playing music written in the key of D, with a key signature containing two sharps. In FIG. 10 the group of two dark landmarks straddles the tonic digital, indicating that a D note in the written music should be played on the tonic digital. Similarly, a C note in the body of the written music will be played to the immediate left of a group of two dark landmarks, on a subtonic digital (VII). Any E note should be played to the immediate right of a group of two dark landmarks, on a supertonic digital (II). Any F note in the body of the written music should be played on a mediant digital (III); any G note should be played on a subdominant digital (IV), and so on. To sound in the written key of D, the uniform pitch changer in the sound module must be set two semitones above standard pitch, so that the tonic digital sounds the key tone D; the subtonic digital sounds the C-sharp tone, the supertonic digital sounds the E tone, the mediant digital sounds the F-sharp tone, and so on.

This same position of the keyboard landmarks can also be used to play music written in the key of D-flat, which has a key signature containing five flats. In this case the uniform pitch changer should be set only one semitone above standard pitch, so that the tonic digital sounds the key tone D-flat, the subtonic digital sounds the C tone, the supertonic digital sounds the tone E-flat, the mediant digital sounds the F tone, and so on.

FIG. 11 shows the same twelve digitals, but here the landmark pattern has been moved bodily leftward from its standard position by the distance *2d*, where d is one seventh of an octave span. This is the landmark position for playing music written in the key of E or E-flat. Accordingly, to sound at the written pitch the uniform pitch changer should be set either four or three semitones above standard pitch. If the key signature contains four sharps the uniform pitch changer should be set four semitones above standard pitch so that an E note in the body of the written music will be played on a tonic digital. Any F note in the body of a written music will be played on the supertonic digital, which sounds the F-sharp tone, and so on.

FIG. 12 shows the same twelve digitals, and here the landmark patter has been moved leftward by the distance *3d*. This is the position for playing music written in the key of F or F-sharp, so that the uniform pitch chamber can be set either five or six semitones above standard pitch. If the key signature contains a single flat the uniform pitch changer should be set five semitones above standard pitch so that the tonic digital will sound the F tone. An F note in the body of the written music will be played to the immediate left of the group of three dark landmarks, on the tonic digital I, an E note will be played on the subtonic digital VII, a G note on the supertonic digital II. Any B note in the body of the written music will be played on the subdominant digital IV, which will sound the B-flat tone.

For these three leftward movements of the keyboard landmarks, appropriate settings of the uniform pitch changer are tabulated in FIG. 16. Referring to FIG. 16, for a leftward movement of the landmarks by a distance Md from their standard position, the uniform pitch changer is raised above standard pitch by either 2M−1 or 2M semitones, depending on whether the key signature in the written music contains flats or sharps. When the number of leftward steps M from the standard position is greater than three the corresponding increase of pitch for the uniform pitch changer is $P=2M-Q$ semitones, (sharps)

$P=2M-Q-1$ semitones, (flats)

where Q is the integral quotient of 2M divided by seven. For values of M up to three the value of Q is zero. The uniform pitch chamber can be set differently if necessary to accommodate a particular singer or group of singers.

Referring to FIG. 13, for definiteness of description we assume that this landmark pattern has been moved three steps rightward from its standard position, and accordingly set the uniform pitch changer to lower the output pitch five semitones below standard pitch to the key of G. Then any G note in the body of the written music, played by guidance from the group of three dark landmarks, will be played on the tonic digital I, which will sound the G tone. An F note in the body of the written music will be played to the immediate left of the group of three dark landmarks, on the subtonic digital VII, which can sound the F-sharp tone.

In FIG. 14 any A note in the body of the written music will be played on the tonic digital, which will sound the A or A-flat tone, depending on the setting of the uniform pitch changer. In FIG. 15 the landmarks are only one step to the right of their standard position. Any B note in the body of the written music will be played to the immediate right of the group of three dark landmarks, on the tonic digital, which will sound the tone B or B-flat, depending on the setting of the uniform pitch changer. For these three rightward moves of the keyboard landmarks, appropriate settings of the uniform pitch chamber are tabulated in FIG. 17.

Referring to FIG. 17, for a rightward movement of the landmarks by a distance Md from their standard position, the uniform pitch changer is set to lower the output pitch below standard pitch by either 2M or 2M−1 semitones, depending on whether the key signature in the written music contains flats or sharps. When the number of rightward steps M from the standard position is greater than three the corresponding decrease of pitch for the uniform pitch changer is $P=2M-Q$, (flats)

$P=2M-Q-1$, (sharps)

where Q is the integral quotient of 2M divided by seven. For values of M up to three the value of Q is zero. Different pitches can be set to accommodate particular singers.

Notes that are sharped or flatted in accordance with a key signature are always played on front digitals of the keyboard. When the key signature contains sharps a "natural" note is played on the back digital to the immediate left of the front digital designated in the body of the written music. When the key signature contains flats a "natural" note is played on the back digital to the immediate right of the designated front digital. There is always a back digital available to play each natural note and any other accidental note in the written music.

When a key signature in written music is encountered, the proper position of the keyboard landmarks is selected on an array of pushbuttons in accordance with the number of sharps or flats in the key signature. Referring to FIG. 18, each of push buttons 69 selects the landmark position for two key signatures. For example, the pushbutton labeled "4 sharps or 3 flats" is used for music written in the key of E or E-flat. The eight pushbuttons need only seven different output leads 70–76, which are coupled together by electronic interlock module 78 so that if one of the pushbuttons is momentarily touched its output lead assumes a positive potential and the other six output leads assume a negative potential. Details of the interlock module are shown in FIG. 19.

Referring to FIG. 19, the seven pushbutton output leads 70–76 serve as inputs to NOR gates 81–88. If, for example lead 70 is forced to the upper power supply potential by momentarily depressing its pushbutton, then the positive signal traverses OR gates 91–96 to provide positive inputs to NOR gates 83–88, whose negative outputs traverse OR gates 79, 80, 98, 103, 104 to provide a negative feedback to NOR gates 81 and 82. Since the other input of NOR gate 82 is made momentarily negative by NOR gate 81, the output of NOR gate 82 becomes positive, locking lead 70 at its positive potential until another pushbutton is touched.

Similarly, when lead 70 is forced to the upper power supply potential, a positive signal is transmitted on each lead 89 to any interlock module to which it is connected, which results in return of a negative feedback to the adjacent one of receiver leads 90, which is required to lock in the positive potential of lead 70. If either of receiver leads 90 is not connected to another interlock module it is connected to ground, as shown in FIG. 18. In FIG. 18 the unused input lead 77 is also connected to ground.

Output leads from the key signature selection pushbuttons also run to a landmark pattern position transmitter, shown in FIG. 20, which is packaged with the interlock module of FIG. 19. Referring to FIG. 20, in order to simplify electrical connections to the landmark control units, leads 70–76 are numbered from one to seven in order of the pitch of their non-flatted key notes, starting with G, and these numbers are converted into a 421 weighted binary code using OR gates 63, 64, 65 with output signal leads 66, 67, 68. The binary coded signal on these three signal leads is transmitted to identical landmark control modules distributed along the keyboard.

Figure 21:
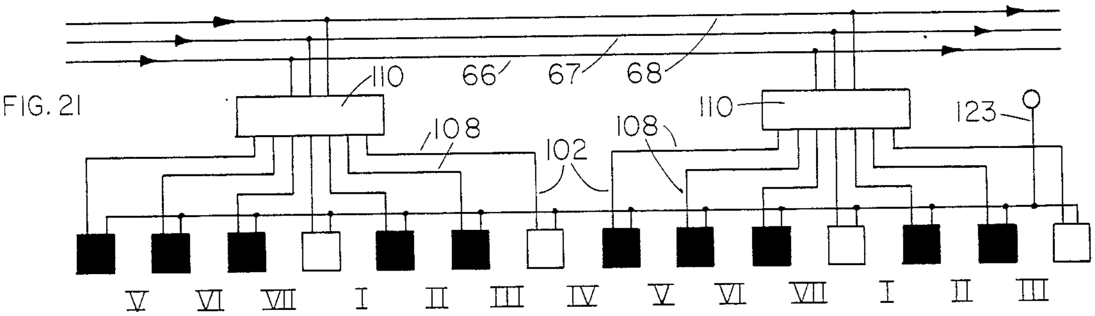
FIG. 21 shows landmark control modules distributed along the keyboard.

Referring to FIG. 21, each of the landmark control modules 110 has three signal input leads and seven power output leads 108, which are enough to control the landmark elements for a full octave span of the keyboard. Details of one of the control modules are shown in FIG. 22.

Figure 22:
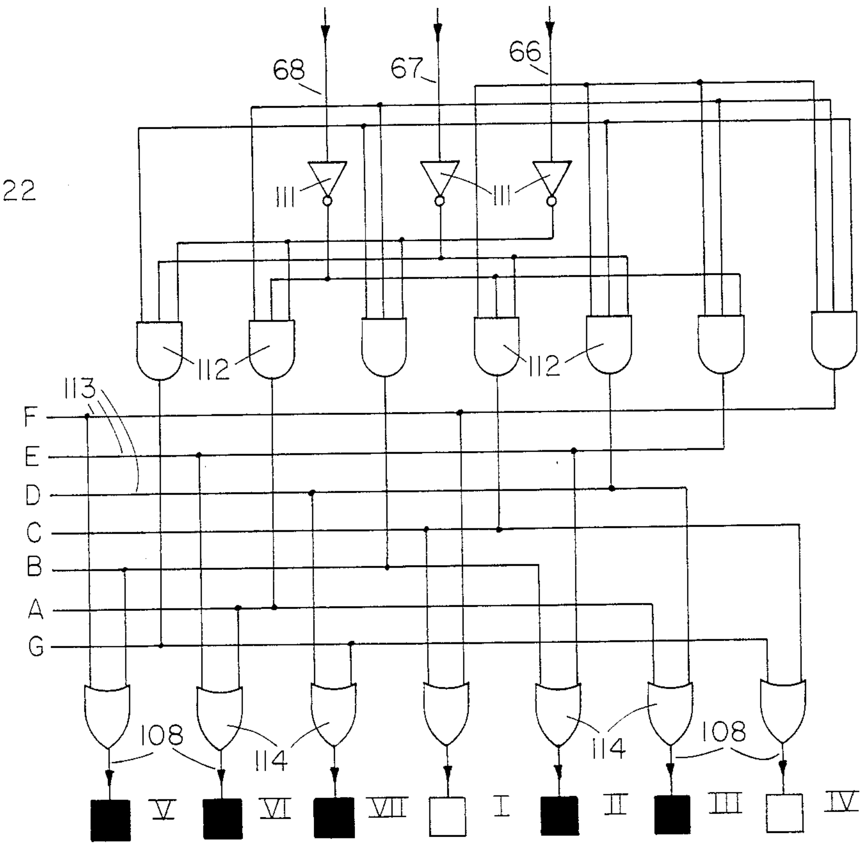
FIG. 22 shows electrical circuitry in a landmark control module.

Referring to FIG. 22, the coded signals on input leads 66, 67, 68 are inverted by inverters 111 and decoded by AND gates 112 into a single positive signal on one of the seven leads 113, which are labeled according to the selected musical key. The remaining six leads 113 are negative. The landmark elements are identified by their positions relative to the fixed front digitals, whose positions are labeled by Roman numerals as shown in FIG. 9. Five landmark elements per octave span are always dark and two are white. The pattern shown in FIG. 22 is in the standard position for the key of C, for which the landmark elements to the immediate left of the tonic and subdominant front digitals are white. In this standard position these two white landmark elements receive positive signals through OR gates 114 from the fourth of leads 113, labeled for the key of C.

In the key of D the landmark pattern is moved one step to the left. Thus the landmark elements to the left of the subtonic and mediant front digitals receive their positive signals from the fifth of leads 113, labeled for the key of D. And so on.

Figure 23:
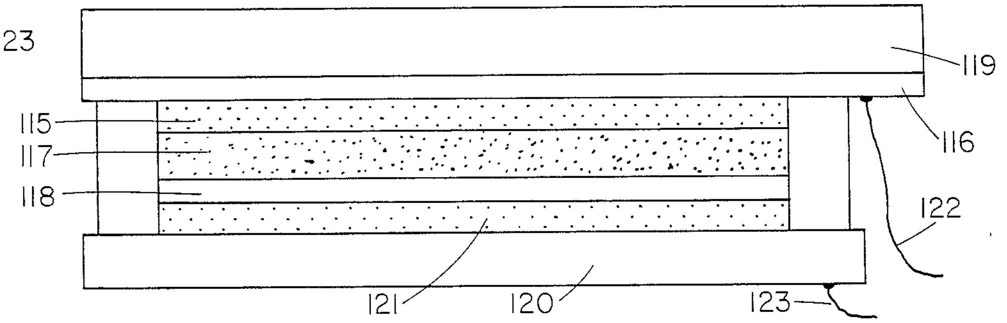
FIG. 23 shows a cross sectional view of an electrically changeable landmark element.

The landmark elements are very thin. FIG. 23 shows a cross-sectional view with the vertical distances greatly increased. Referring to FIG. 23, glass cover plate 119 has a transparent conductive film 116, such as indium oxide and tin oxide formed on its lower surface. On the conducting film is formed a tungsten oxide electrochromic film 115 by a process described in U.S. Pat. No. 4,278,329, assigned to the Asahi Glass Company. Below this electrochromic layer is electrolyte 117 comprising $LiClO_4$ dissolved in an organic solvent such as propylenecarbonate. Bottom plate 120 has a counter electrode 121 of tungsten oxide formed as described in U.S. Pat. No. 4,278,329, col. 7. Between the electrolyte and the counter electrode is inserted white reflector film 118 to reflect light incident from above. Lead 122 supplies current to the conducting film 116, and lead 123 supplies current to conducting bottom plate 120.

When lead 122 is made 0.6 volt positive with respect to lead 123, the landmark element appears white as viewed from above by reflected light. When lead 122 is made 1.5 volt negative with respect to lead 123, the landmark element appears dark as viewed from above by reflection of light. The negative potential on display electrode 115 attracts lithium ions from the electrolyte to form light absorbent impurity centers in the tungsten oxide film 115 in accordance with the equation $$\underset{\text{Transparent}}{WO_3 + XLi^+ + x\,\theta^-} = \underset{\text{Absorbent}}{Li_xWO_3}$$

Figure 24:
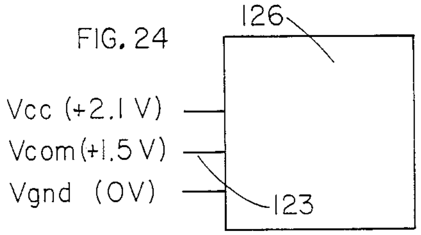
FIG. 24 shows a power supply for the keyboard landmarks.

The power supply is shown in FIG. 24. Referring to FIG. 24, power supply 126 delivers two positive voltages with respect to ground. Common lead 123 feeds the counter electrodes of all landmark elements. The output leads 108 from OR gates 114 in FIG. 22, are either 0.6 volt positive with respect to the common lead 123 or else 1.5 volt negative with respect to the common lead.

Figure 25:
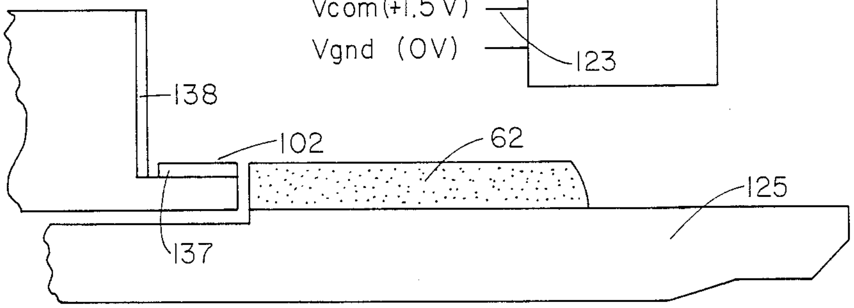
FIG. 25 shows a side view of keyboard digitals.

In order to increase the apparent size of the landmarks, a thin back surface mirror is mounted behind them, as shown in FIG. 25. Referring to FIG. 25, landmarks 102 are mounted on keyboard display strip 137 which is positioned behind and above back digitals 62 and front digitals 125. Mirror 138 produces horizontal images behind the mirror of the horizontal landmarks, which have the effect of doubling the landmark size and increasing their visibility. In manufacture, the landmark elements are first attached to display strip 137, then the display strip is fixed to the keyboard. Since the display pattern moves along the keyboard in steps of length "d", the element-to-element spacing between corresponding points of the landmark elements is made equal to "d", the digital-to-digital spacing between corresponding parts of the front digitals.

OTHER EMBODIMENTS

For new music students who have not become accustomed to using the back digitals as landmarks, better movable landmarks may be used. A direct translation of notes on a musical staff into position on the keyboard is created by landmarks on the front digitals that represent staff lines of the written music. This landmark system also needs seven electrically changeable landmark elements per octave span. In addition to using such landmarks, a second embodiment combines into one operation the setting of the landmark pattern position and the setting of a uniform pitch changer. The second embodiment selects a key signature by means of an array of fifteen pushbuttons as shown in FIG. 28.

Figure 28:
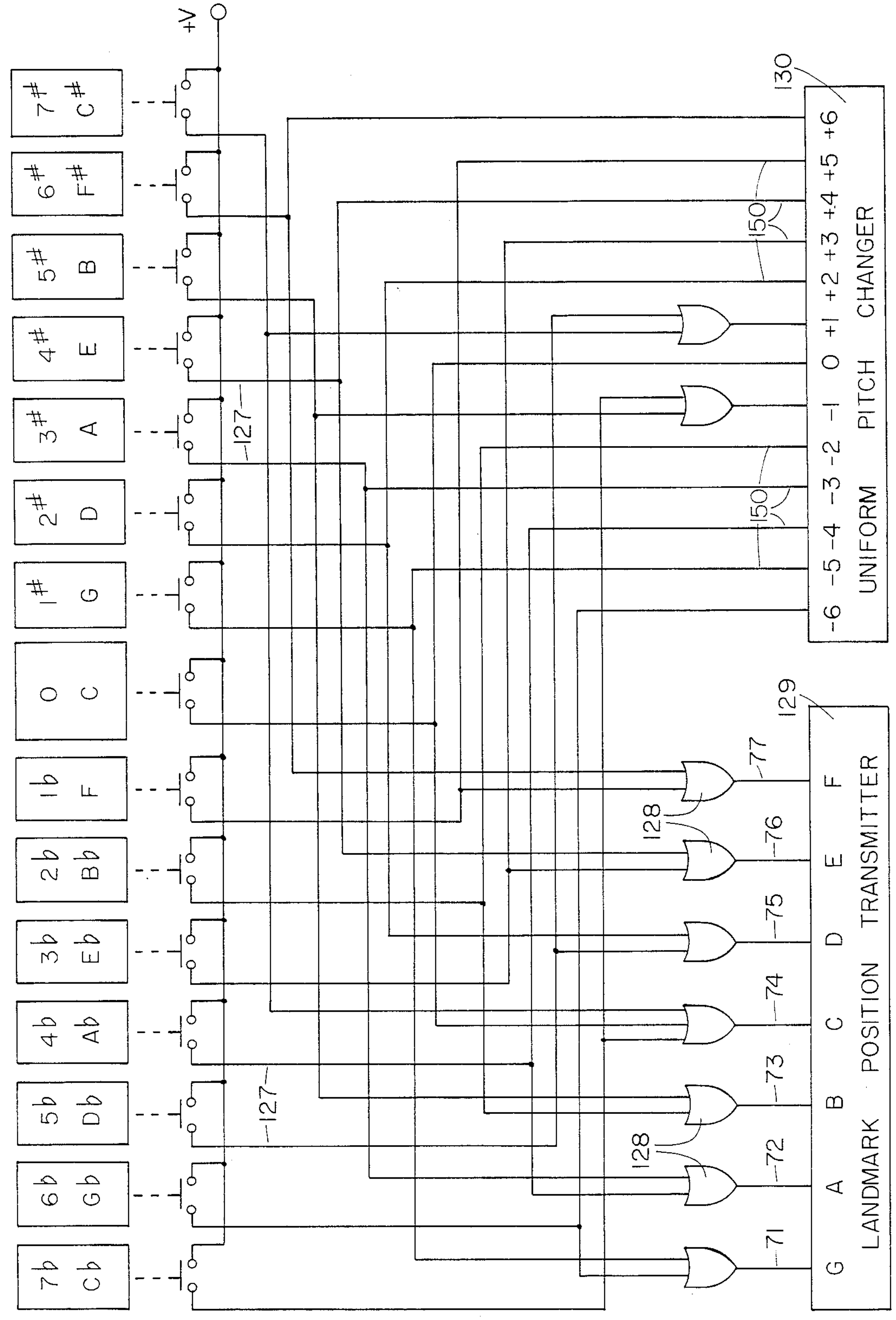

Referring to FIG. 28, output leads 127 from the 15 pushbuttons feed seven OR gates 128 leading to a landmark pattern position transmitter 129, similar to that shown in FIG. 20. The fifteen pushbutton leads also run to the thirteen inputs of automated uniform pitch changer 130, the two key signatures having seven flats and five sharps requiring the same pitch lowering of one semitone; the two key signatures having five flats and seven sharps requiring the same pitch increase of one semitone. The pushbuttons are arranged according to the numbers of flats or sharps in the key signature, but the key note for each key signature is also marked on the pushbutton. The output leads 127 are coupled together so that only one lead can be positive and the other fourteen leads are negative. This coupling is accomplished by a pair of electronic interlock modules as shown in FIG. 29.

Figure 29:
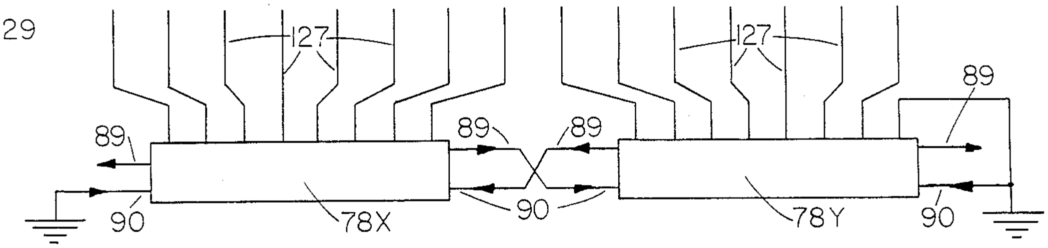
FIG. 29 shows electronic interlock modules for the pushbutton arrays in FIGS. 27, 28, 38.

Referring to FIG. 29, interlock modules 78X and 78Y are identical to module 78 shown in FIG. 19. One of transmitter leads 89 of module 78X is connected to a receiver lead 90 of module 78Y, and one of the transmitter leads 89 of module 78Y is connected to a receiver lead 90 of module 78X. Thus if a particular input lead to the interlock is forced to become positive the other input leads are made negative, and feedback from them keeps the particular input lead positive even after its pushbutton is released. Since the key signature selection array has only fifteen pushbuttons, the last input lead of module 78Y is connected to ground, along with the two unused receiver leads 90.

Figure 26:
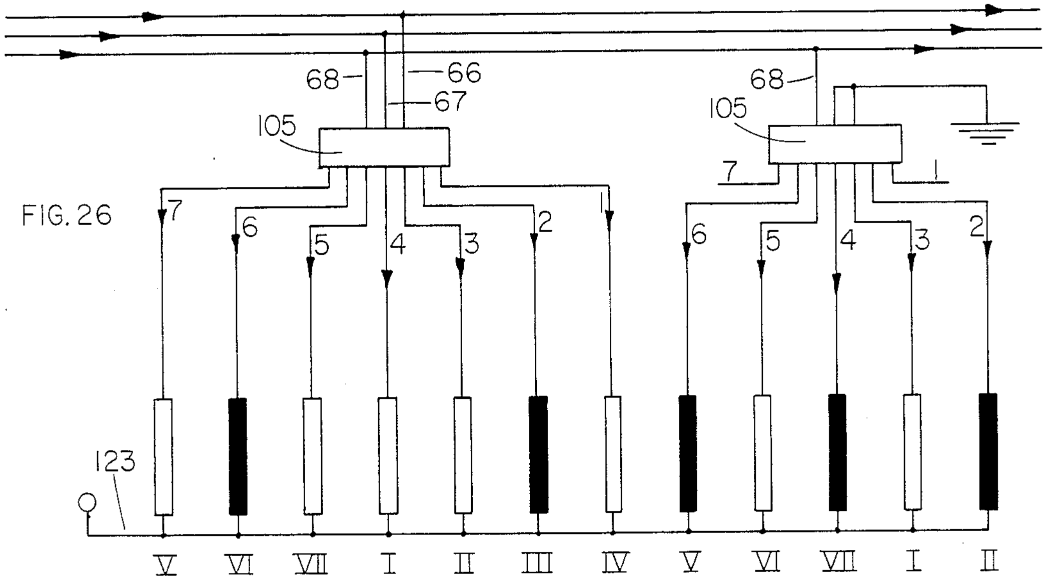
FIG. 26 shows landmark control modules for a second embodiment.

The landmark pattern position transmitter shown in FIG. 28, like that shown in FIG. 20, transmits a binary code for landmark position on signal leads 66, 67, 68 along the keyboard. The keyboard landmark pattern simulating the musical staffs is periodic with a period occupying twelve front digitals of the keyboard. As illustrated in FIG. 26, several groups of twelve consecutive front diitals are each supplied by a pair of landmark control modules 105. One module in each pair supplies the seven front digitals where it is necessary to blank out dark landmark elements to represent a midpoint between musical staffs. The second module of the pair supplies the remaining five front digitals of the group of twelve. Two input leads on this second module are permanently grounded. Since ground potential on these leads allows blanking of the dark landmark elements only on output lead no. 1, and since output lead no. 1 of the second control module is not connected to the keyboard, this module does not blank out any dark landmark elements on the keyboard. As the non-flatted key notes associated with selected key signatures increase progressively in pitch to F the blanked out dark landmarks on the keyboard move progressively leftward. The two landmark control modules 105 are internally identical. Their internal circuitry is shown in FIG. 30.

Figure 30:
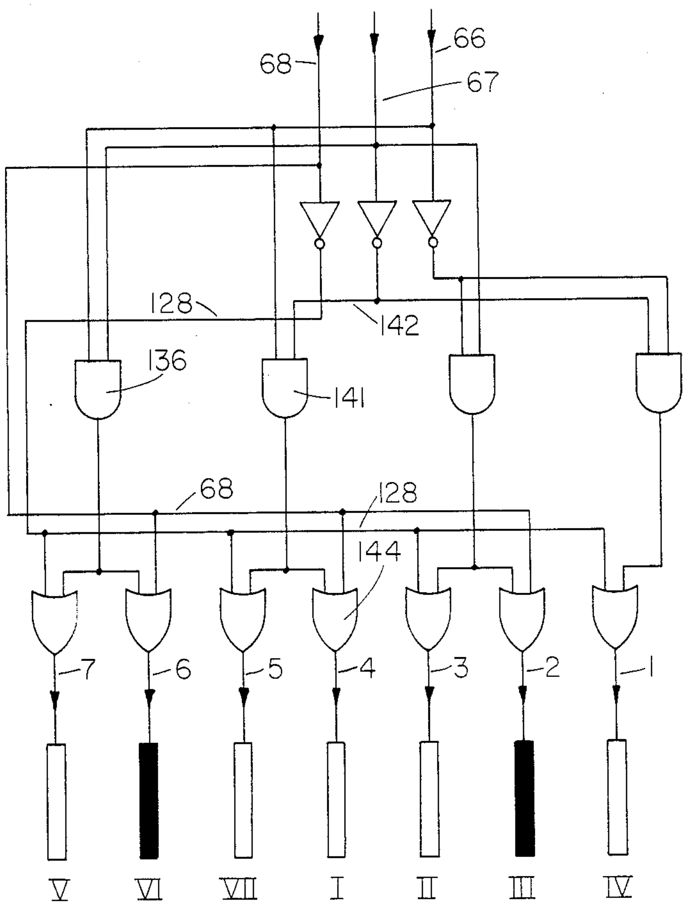
FIG. 30 shows electrical circuitry for controlling landmarks in the second embodiment.

Referring to FIG. 30, this landmark control module, like that shown in FIG. 22, has three signal input leads 66, 67, 68 and seven power output leads to seven different display modules. The potential on lead 68 and its inversion on lead 128 are alternatively positive and negative as the binary coded number increases along the keybarod, tending to produce dark landmark elements on alternate front digitals throughout the keyboard. Output lead no. 4 in this module controls the landmark element on the middle C digital. Assuming that the key signature actuator is set for the key of C, the binary number transmitted on leads 66, 67, 68 will be 4. Thus lead 66 will be high and leads 67, 68 low. The low value on lead 68 would by itself produce a dark landmark element on the middle C digital. But the high value on lead 66 combined with the high value on lead 142 (the inversion of the value on lead 67) produce a positive output from AND gate 141 which passes through OR gate 144 to blank out that dark landmark element, as it should for the middle C front digital when playing in the key of C.

When the key signature actuator is set for the key of D the blanked out dark landmark element moves leftward to the subtonic digital, so that a C in the written music will be played on the subtonic digital and a D will be played on the tonic digital. Mounting of landmark elements on the front digitals is described in my copending patent application Ser. No. 921,407, U.S. Pat. No. 4,750,399.

Figure 32:
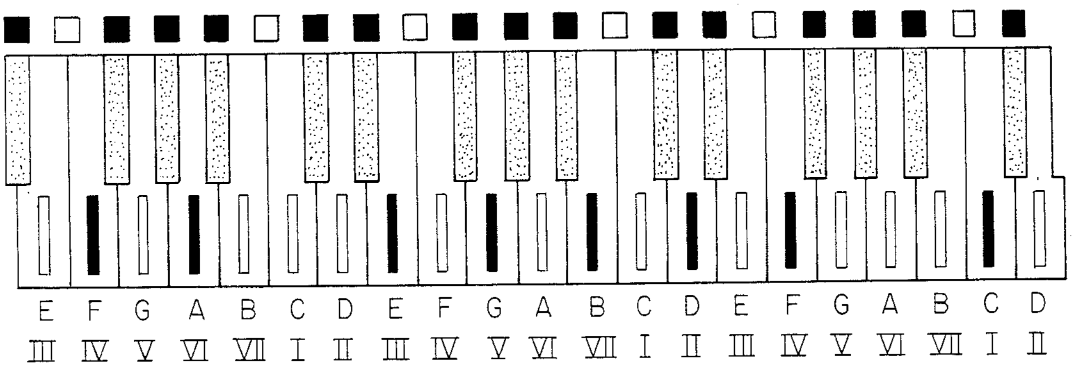
FIGS. 32–36 show keyboard landmark patterns in different positions for the second embodiment.

A keyboard having landmarks at both its back and front needs a total of fourteen separately changeable landmark elements per octave span. FIG. 32 shows both sets of landmarks in their standard position, in which the middle C note is played on the tonic digital midway between two simulated musical staffs.

Figure 33:
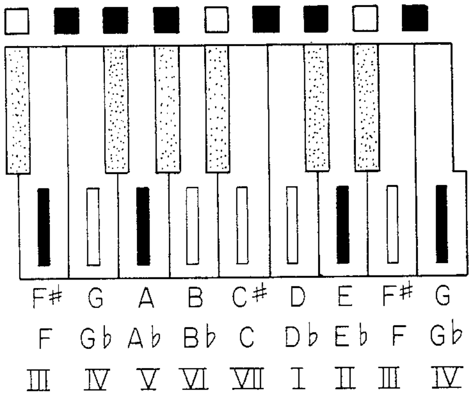

Referring to FIG. 33, the landmarks have moved one step leftward from their standard position so that a C note in the body of the written music will be played on the subtonic digital and a D note in the body of the written music will be played on the tonic digital. The automated uniform pitch changer will increase the pitch by either two semitones or one semitone above standard pitch, depending on whether a key signature with two sharps or one with five flats has been selected.

Figure 34:
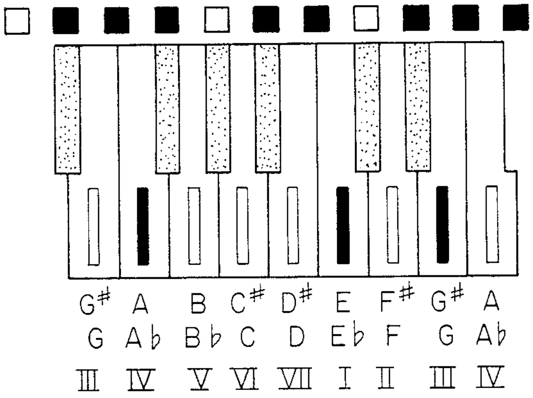

In FIG. 34 the landmarks have been moved two steps leftward from their standard position so that an E note in the body of the written music will be played on the tonic digital. The automated uniform pitch changer will increase the pitch by four or three semitones above standard pitch, so that the tonic digital sounds the tone E or E-flat.

Figure 35:
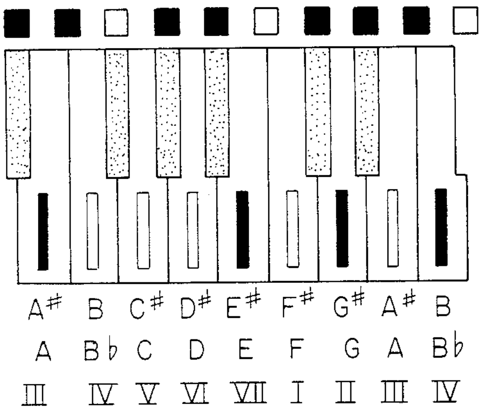

In FIG. 35 the landmarks have been moved three steps leftward from their standard position, so that an F note in the body of the written music will be played on a tonic digital. The automated uniform pitch changer will increase the pitch by five or six semitones above standard pitch, so that the tonic digital sounds the tone F or F-sharp.

Figure 36:
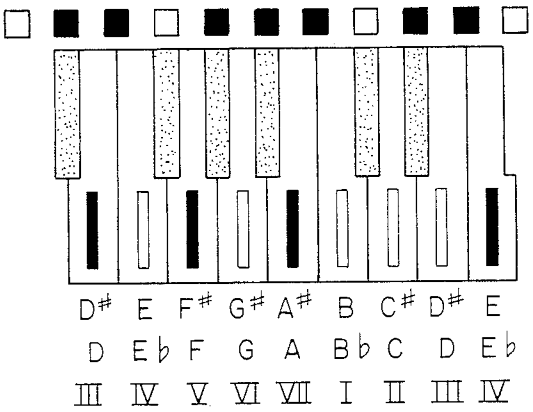

In FIG. 36 the landmarks have been moved one step to the right from their standard position, so that each B note in the body of the written music will be played on a tonic digital. The automated uniform pitch changer will lower the output pitch by one or two semitones below standard pitch, so that a tonic digital will sound the tone B or B-flat, depending on whether a key signature containing five sharps or one containing two flats has been selected.

The automated uniform pitch changer of the present embodiment operates by affecting the pitch signals that are transmitted from the keyboard to the second module. The keyboard digital switches are repeatedly scanned; when digitals are depressed "note on" and "note off" signals are sent to the sound module in time sequence. The keyboard scanner and note signal transmitter are shown in FIG. 37.

Figure 37:
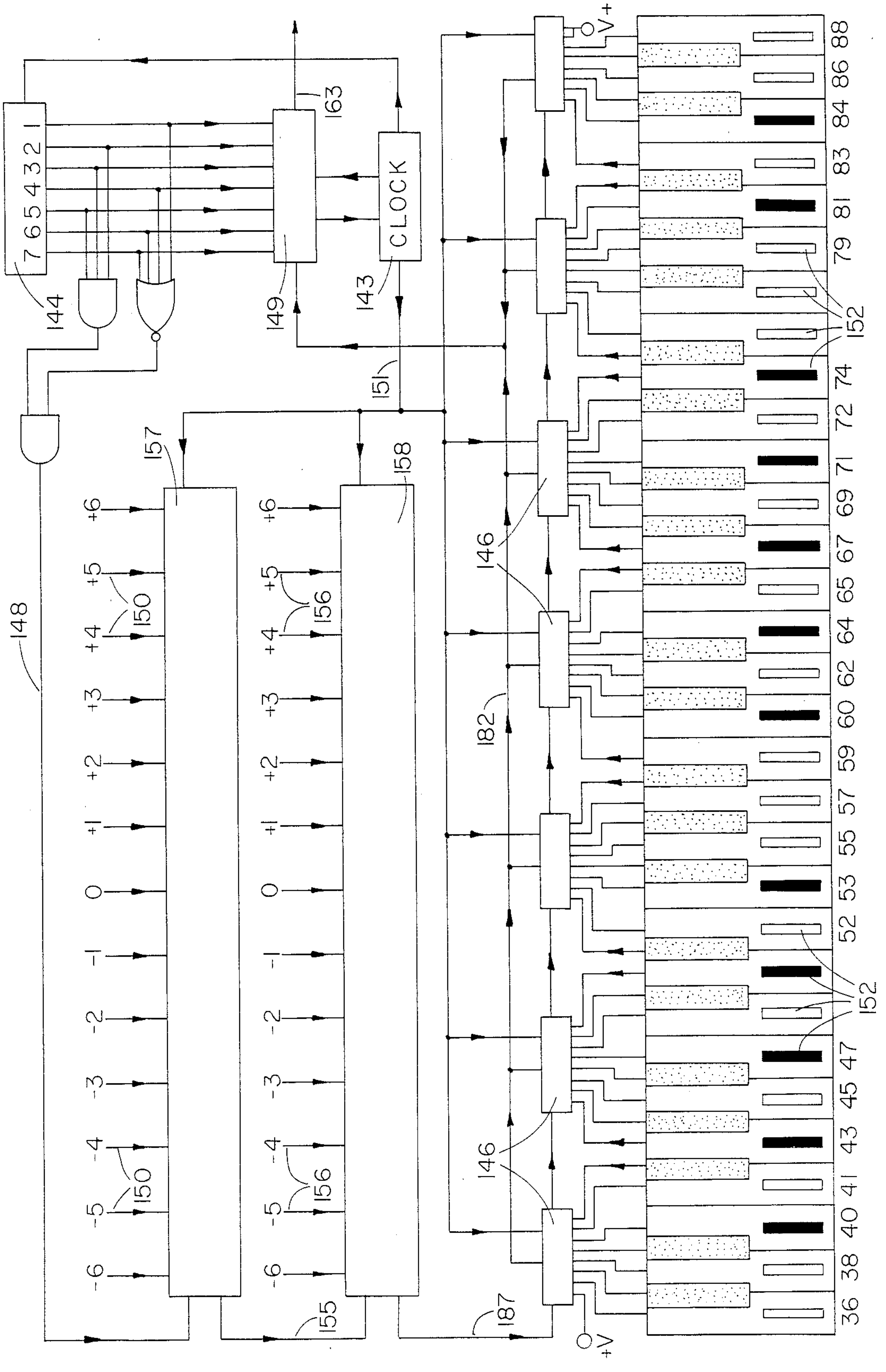
FIG. 37 shows an automated uniform pitch changer and a manually controlled uniform pitch changer for the second embodiment.

Referring to FIG. 37, electronic clock 143 sends clock pulses to seven stage binary counter 144, which repeatedly counts from zero to 127. These clock signals also clock the 56 stage time division multiplexer 146, which is distributed along the keyboard in seven sections of eight stages each. This multiplexer rapidly scans the 53 digitals of the keyboard to detect when each digital is depressed and when it is released. Whenever a keyboard digital is depressed a corresponding signal is sent on multiplexer bus 182 to note transmitter 149. The pitch number on binary counter 144 for each "note on" and "note off" event is sent by transmitter 149 to the sound module, these pitch signals being used to sound tones of the appropriate pitch and duration.

The seven sections of multiplexer 146 are identical. The first one of these sections is diagramed in FIG. 40, within the dotted rectangle. In FIG. 40, the eight-stage shift register section 183 normally has a low output from each stage, but during each keyboard scan a single enabling bit traverses the register from left to right, momentarily giving a positive output voltage from each stage, that momentarily closes transmission gates 177 in time sequence, allowing sensing of whether their associated keyboard digitals are depressed. When a keyboard digital is depressed its associated lead 184 becomes positive, and a corresponding signal is sent in its time slot on multiplexer bus 182 to note transmitter 149 shown in FIG. 37.

Referring still to FIG. 40, in order to eliminate the effects of contact bounce and vibration, keyboard digital switches 185 may contract with two busbars 186, 179 held at the upper and lower power supply potentials. When a keyboard digital is not depressed its associated digital switch output lead 178 is held at ground potential by switch contact with busbar 179. This output lead feeds the input of one of non-inverting D.C. amplifiers 180, whose output is fed back to its input through one of feedback resistors 181. The positive feedback latches the input potentials, so that while a digital is being depressed its switch output lead 178 is held at ground potential. When the keyboard digital is fully depressed, its outut lead 178 is forced by touching busbar 186 to the upper power supply potential, where it remains until the keyboard digital is released and switch contract with ground busbar 179 is restored.

The D.C. amplifiers 180 have a high input resistance, so that they draw negligible power except during "note on" and "note off" events. The energy dissipated by the amplifiers during these events can be limited by making their output resistance rather high, in which case output leads 200 can be connected directly to their amplifier input, instead of through external resistors 181.

Outputs from the D.C. amplifiers 180 travel through buffers 201, and momentarily through transmission gates 177 and multiplex bus 182 to the note transmitter shown in FIG. 37.

Referring again to FIG. 37, each time binary counter 144 reaches a count of 22 it sends a scan start pulse on lead 148 to delay line 157. In the key of C the input lead 150 labeled "O" would be positive, so that at the count of 28 a positive pulse from delay line 157 is sent through delay line 158 and lead 187 to the input of multiplexer 146. The pulse trasverses the multiplexer scan register and reaches standard tonic digital no. 60 at the count of 60 on counter 144. This pitch number, in binary code, is available in note transmitter 149, which transmits a pitch signal on lead 163 to the sound module whenever a keyboard digital is depressed or released. The technology of Musical Instrument Digital Interface (MIDI) is well known, the specification for transmission of pitch signals from keyboard to sound module being published in the United States by the MIDI Manufacturers Association and by the International MIDI Association. The pitch number 60 which is transmitted in binary code to the sound module for the tone of middle C is in accordance with the MIDI specification.

In the key of D the input lead 150 labeled "+2" becomes positive, so that the keyboard scanning pulse is delayed by two more clock counts in delay line 157, reaching standard tonic digital no. 60 at the count of 62 on counter 144. In accordance with the MIDI specification, transmitted pitch number 62 makes the sound module generate the tone of middle D. This is the proper tone for tonic digital no. 60 to sound when playing in the key of D. If the G pushbutton in the key signature actuator is depressed, the keyboard scanning pulse has a reduced delay in delay line 157 so that it reaches standard tonic digital no. 60 at the count of 55 on counter 144. In accordance with the MIDI specification, transmitted pitch number 55 makes the sound module generate the tone of low G. This is the proper tone for tonic digital no. 60 to sound when playing in the key of G.

Thus when the key signature actuator is set to actuate a particular key signature in written music, the keyboad landmarks are moved so as to position its keynote at a tonic digital—and the musical output pitch is automatically adjusted so that the musical composition will sound at the intended pitch of the written music.

In general, when the output pitch is to be uniformly raised by N semitones, the pitch number (PN) will be related to the digital number (DN) on the keyboard by the equation $$PN=DN+N.$$

When the output pitch is to be uniformly lowered by N semitones the pitch number will be related to the digital number on the keyboard by the equation $$PN=DN-N.$$

The relationship of N to movement of the pattern of landmarks is the same as listed in FIGS. 16, 17 for the preferred embodiment. Thus when the landmarks are moved a distance Md to the left of their standard position, the automatic and uniform increase of pitch N is either $2M=Q$ or $2M-Q-1$ semitones, depending on whether the key signature contains sharps or flats, where Q is the integral quotient of 2M divided by seven. On the other hand, when the landmark pattern is moved a distance Md to the right of its standard position the automatic decrease of pitch is either $2M-Q$ or $2M-Q-1$ semitones, depending on whether the key signature contains flats or sharps. These relationships between the landmarks movements and the overall change of pitch will make the musical output from the sound generator sound at the intended pitch of the written music.

The keyboard musician may sometimes wish to depart from the intended pitch of the written music in order to accommodate a particular singer or group of singers. To allow such a change of pitch the apparatus is provided with a second delay line 158 which is independently controlled by an array of pushbuttons, shown in FIG. 38.

Referring to FIG. 38, the thirteen output leads 156 from the pushbutton array are coupled together by a pair of interlock modules as shown in FIG. 29, so that when depressing a pushbutton forces a particular one of leads 156 to a positive potential, the other twelve output leads 156 assume a negative potential, and feedback from them keeps the particular lead 156 at its positive potential until another pushbutton is depressed. The positive potential on this particular lead controls the scan delay in delay line 158 (shown in FIG. 37) so as to raise or lower the musical output pitch by the selected number of semitones, as indicated by the label on the selected pushbutton. Delay line 158 is identical to the automated delay line 157, except that its positive pulse enters on lead 155 instead of 148, and exits by lead 187 instead of lead 155. Integration of the manually controlled delay with the automated delay in one transposer avoids the extra time delay caused by two separate uniform pitch changes. The internal structure of both delay lines is shown in FIG. 39.

Referring to FIG. 39, shift register 145 is clocked by pulses from clock 143 (shown in FIG. 37) which enter the delay line on lead 151. A single positive pulse from counter 144 (shown in FIG. 37) enters at the left end of the shift register and moves one stage to the right on each clock pulse. A particular one of pitch control leads 153 will be positive, and this opens its corresponding one of electronic switches 147, so that when the positive pulse in shift register 145 reaches that particular electronic switch it can exit by output bus 168.

When notes in the body of the written music are properly associated with the movable keyboard landmarks the sharps or flats in the key signature will be automatically actuated. Most notes will be played on the wide front digitals of the keyboard. The variable positioning of the back digitals will give an improved feeling for the tonality of the music when it is written in a key other than C, and the keyboard fingering will be exactly the same regardless of the key in which the music is written. This easing of the technical requirements of the music allows more attention to its expressive aspects.

Figure 31:
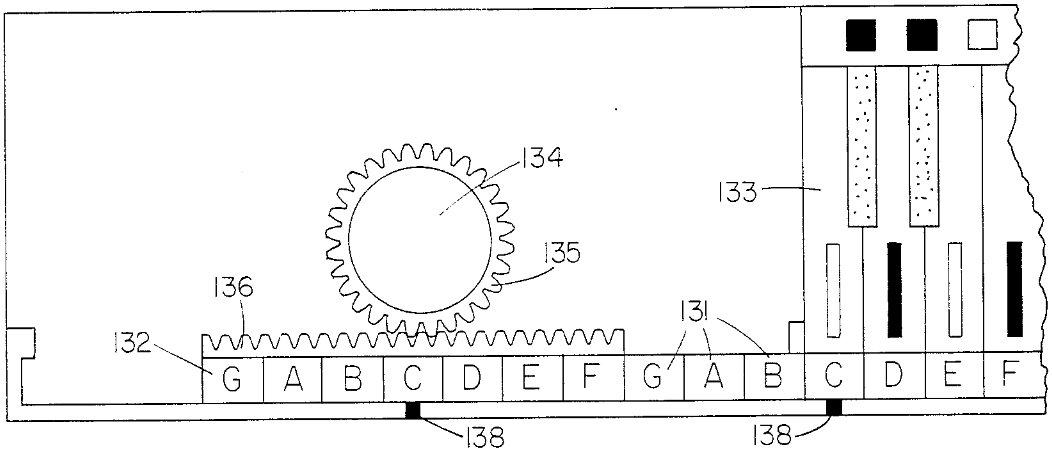
FIG. 31 shows a mechanically operable landmark positioner.

In teaching use of this type of key signature actuator to children it is helpful to have letter labels for the lines and spaces of the musical staffs that move along with the keyboard landmarks representing the musical staffs. In a third embodiment such letter labels are mounted on a movable strip that is positioned immediately in front of the keyboard, as shown in FIG. 31. Referring to FIG. 31, letter labels 131 are mounted on movable strip 132 that slides along the front of keyboard 133. The strip is moved by means of a gear wheel 135 which meshes with gear rack 136 fixed to the movable strip. A knob 134 turns the gear wheel, and an indent wheel is attached to and rotates with it. (not shown) The indent wheel is notched every 45.3 degrees to establish an index angle of 45.3 degrees between landmark positions. This ensures that strip 132 moves to seven discrete positions along the keyboard, the distance between consecutive positions being one seventh of an octave span. The pitch diameter of the gear wheel is 2.33 inches (5.93 cm). The strip 132 is positioned in accordance with the key note of the selected key signature, using small markers 138. To avoid interferene with the player's hands the letter display is positioned slightly lower than the tops of the front digitals.

Instead of carrying letter labels, movable strip 132 can be used to carry the landmarks representing musical staffs in the written music, or, positioned at the back of the keyboard, a mechanically movable strip can carry landmarks simulating the back digitals. As in the preferred and second embodiments, these landmarks can then be moved to seven discrete positions along the front or back of the keyboard.

Changeable letter labels for the front digitals of the keyboard can also be formed and moved along the the keyboard electronically, like the electronic keyboard landmarks positioned on the front digitals and at the back of the keyboard. For this purpose an electronically controlled dot matrix character is fixed in position in front of each front digital of the keyboard, as described in my copending patent application Ser. No. 921,407, page 26, line 17 to page 28, line 2.

Figure 27:
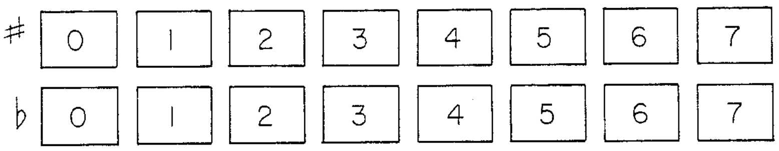
FIGS. 27, 28 show arrays of pushbuttons to select a key signature for the second embodiment.

The technology of display of letters and words by dot matrixes is well known, being widely employed in the manufacture, for example, of portable computers. Portable computers having liquid crystal dot matrix displays are marketed by Hewlett-Packard, Tandy Corp., Zenith Electronics Corp., Toshiba, and NEC. If letter labels of the electronic type are used, then one selection of a key signature on a pushbutton array can be used to position all three sets of landmarks—those representing the back digitals, those representing the lines of the musical staff, and the letters labeling the lines and spaces of the musical staffs. If the dot matrix characters aligned with the tonic digitals are provided with markers like 138 in FIG. 31, their letters will provide an indication of the musical key that has been selected. In this case indication of the key notes may be omitted from the pushbutton array shown in FIG. 28, and the key signature can be selected on a more compact array as shown in FIG. 27. The sharp and flat symbols shown in FIGS. 33 to 36 need not accompany the letter landmarks, for the letter alone suffices to associate each diatonic note in the body of the written music with a front digital to be played.

A light-emitting keyboard landmark pattern that is bodily movable is described in my U.S. Pat. No. 3,141,371, col. 9, line 71 to col. 11, line 10. This movable pattern was designed for a uniform keyboard having alternating front and back digitals, but it can be used for a keyboard of traditional construction despite the irregular positioning of its back digitals. In this system an individually powered light is positioned under each front digital, to show through its translucent playing surface. The type and color of the lights can be chosen for reasonable economy of manufacture and maintenance.

Instead of using electrochromic elements for non-emitting landmark displays, liquid crystal elements may be used as described in my U.S. Pat. No. 4,640,173, col. 15, line 22 to col. 17, line 46. Ferroelectric elements can also be used, as described in U.S. Pat. Nos. 4,379,621 and 4,556,727.

I claim:

1. An improved keyboard landmark pattern position control for orienting a musician on a musical keyboard, the keyboard having at least twenty-one front digitals and at least fifteen back digitals arranged in a single sequence, any twelve consecutive digitals of the sequence occupying a constant distance of an octave span along the keyboard, each octave span containing seven front digitals and exactly five back digitals, a keyboard landmark pattern including a plurality of at least twenty-one landmark elements arranged along the keyboard, each landmark element being electrically changeable between first and second visual states, the landmark pattern containing pluralities of landmark elements in each of the visual states in every complete octave span, the pattern being bodily movable to a succession of seven discrete positions along the keyboard, the distance between any two consecutive positions of the succession being equal to one seventh of an octave span of the keyboard, the improvement comprising:

a transmitter that electrically transmits landmark pattern position control signals in binary code on at most three signal leads, a plurality of landmark control modules, each of which receives the control signals on at most three signal leads and sends out electrical power on at least five output leads to at least five different members of the plurality of landmark elements.

2. An improved keyboard display for orienting a player on a musical keyboard, the keyboard having at least fourteen front digitals and at least ten back digitals arranged in a single sequence, any twelve consecutive digitals of the sequence occupying a constant distance of an octave span along the keyboard, each octave span containing exactly seven front digitals and exactly five back digitals, the improvement comprising:

a display of seven different letter labels arranged in a line along the front of the keyboard, one of the labels aligned with each of seven consecutive front digital of the keyboard, means for bodily moving the display of letter labels to a succession of seven discrete positions along the keyboard, the distance between any two consecutive positions of the succession being equal to one seventh of an octave span.

3. An improved keyboard landmark display for orienting a musician on a musical keyboard, the keyboard having at least fourteen front digitals and at least ten back digitals arranged in a playing surface in a single sequence, any twelve consecutive digitals of the sequence occupying a constant distance of an octave span along the keyboard, each octave span containing seven front digitals and exactly five back digitals, the improvement comprising:

a narrow strip having a length of at least two octave spans juxtaposed to the back of the keyboard playing surface, the strip having a display surface substantially parallel to the keyboard playing surface, the display surface bearing a landmark pattern that serves to identify keyboard digitals over a keyboard length of at least two octave spans, the landmark pattern being bodily movable to a succession of at least four discrete positions along the keyboard, the distance between any two consecutive positions of the succession being equal to one seventh of an octave span;

a mirror positioned immediately behind the landmark pattern, the surface of the mirror being substantially perpendicular to the keyboard playing surface so that it reflects an image of the landmark pattern, the height of the mirror above the landmark pattern being at least equal to the width of the landmark pattern, whereby the apparent size and visability of the landmark pattern is increased.

4. An improved keyboard landmark display for orienting a player on a musical keyboard, the keyboard having at least fourteen front digitals and at least ten back digitals arranged in a single sequence, any twelve consecutive digitals of the sequence occupying a constant distance of an octave span along the keyboard, each octave span containing seven front digitals and five back digitals, the improvemenet comprising:

a display strip having a length of at least two octave spans juxtaposed to the keyboard, the strip carrying landmarks for identifying the keyboard digitals over a keyboard length of at least two octave spans, rotary means for mechanically moving the display strip rectilinearly along the keyboard to a succession of at least four discrete positions along the keyboard, the distance between any two consective positions of the succession being equal to one seventh of an octave span.

5. An improved transposer for a musical keyboard having a plurality of twenty-one front digitals and a plurality of fifteen back digitals, each of the front and back digitals having its own digital switch, the front and back digitals being arranged in a single sequence running from left to right in a periodic pattern having a period of twelve digitals, any twelve consecutive digitals of the keyboard occupying a constant distance of an octave span along the keyboard, each octave span containing seven front digitals and exactly five back digitals, the improvement comprising:

a pattern of keyboard landmark elements for identifying the keyboard digitals over a keyboard length of at least two octave spans, a landmark pattern positioner that can position the pattern of landmark elements in a standard position and can move the pattern of landmark elements bodily leftward along the keyboard from its standard position by a distance Md, where d is a distance equal to one sevent of an octave span and M is an integer having at least three different values in the range one to seven inclusive, means for electronically scanning the keyboard digital switches and transmitting corresponding pitch numbers from each of the digital switches.

means for producing first and second variable delays in the electronic scanning of the digital switches and transmission of their pitch numbers, a manually operated key signature selector that controls both the landmark pattern positioner and the first variable delay, the first delay capable of producing a standard pitch number from each of the digitals when the landmark pattern is in its standard position, and of uniformly raising the pitch numbers from all of the digitals by N semitones above their standard pitch numbers, where N is a number in the range $2M-Q-1$ to $2M-Q$ inclusive, where Q is the integral quotient of 2M divided by seven, and Md is the distance of the landmark pattern from its standard position, the second variable delay further producing a uniform change of pitch number from all of the digitals by U semitones, where U is an integer having at least six different values in the range $-12$ to $+12$ inclusive.

6. An improved transposer for a musical keyboard having a plurality of twenty-one front digitals and a plurality of fifteen back digitals, each of the front and back digitals having its own digital switch, the front and back digitals being arranged in a single sequence running from left to right in a periodic pattern having a period of twelve digitals, any twelve consecutive digitals of the keyboard occupying a constant distance of an octave span along the keyboard, each octave span containing seven front digitals and exactly five back digitals, the improvemenet comprising:

a pattern of keyboard landmark elements for identifying the keyboard digitals over a keyboard length of at least two octave spans, a landmark pattern positioner that can position the pattern of landmark elements in a standard position and can move the pattern of landmark elements bodily rightward along the keyboard from its standard position by a distance Md, where d is a distance equal to one seventh of an octave span and M is an integer having at least three different values in the range one to seven inclusive, means for electronically scanning the keyboard digital switches and transmitting corresponding pitch numbers from each of the digital switches, means for producing first and second variable delays in the electronic scanning of the digital switches and transmission of their pitch numbers, a manually operated key signature selector that controls both the landmark pattern positioner and the first variable delay, the first delay capable of producing a standard pitch number from each of the digitals when the landmark pattern is in its standard position, and of uniformly reducing the pitch numbers from all of the digitals by N semitones below their standard itch numbers, where N is a number in the range $2M-Q-1$ to $2M-Q$ inclusive, where Q is the integral quotient of 2M divided by seven, and Md is the distance of the landmark pattern from its standard position, the second variable delay further producing a uniform change of pitch number from all of the digitals by U semitones, where U is an integer having at least six different values in the range $-12$ to $+12$ inclusive.

* * * * *